US008903393B2

(12) United States Patent
Payyappilly et al.

(10) Patent No.: US 8,903,393 B2
(45) Date of Patent: Dec. 2, 2014

(54) WIRELESS COMMUNICATION DEVICE FOR MAINTAINING MINIMUM QUALITY OF SERVICE (QOS) COMMUNICATION SESSIONS DURING HARD HANDOFFS

(75) Inventors: Ajith T. Payyappilly, San Diego, CA (US); Lei Shen, San Diego, CA (US); Parag Arun Agashe, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1604 days.

(21) Appl. No.: 11/835,143

(22) Filed: Aug. 7, 2007

(65) Prior Publication Data

US 2009/0005044 A1 Jan. 1, 2009

Related U.S. Application Data

(60) Provisional application No. 60/946,955, filed on Jun. 28, 2007.

(51) Int. Cl.
*H04W 36/00* (2009.01)
*H04W 36/26* (2009.01)
*H04W 28/24* (2009.01)

(52) U.S. Cl.
CPC .............. *H04W 36/26* (2013.01); *H04W 28/24* (2013.01); *H04W 36/0055* (2013.01)
USPC ............................ 455/436; 370/331; 370/332

(58) Field of Classification Search
USPC ............................ 455/436–444; 370/331–334
See application file for complete search history.

(56) References Cited

U.S. PATENT DOCUMENTS 7,170,872 B2 * 1/2007 Uskela ........................ 370/332

| 2004/0240414 | A1* | 12/2004 | Fan et al. | 370/332 |
| 2006/0072506 | A1* | 4/2006 | Sayeedi et al. | 370/331 |
| 2008/0013488 | A1* | 1/2008 | Garg et al. | 370/331 |

FOREIGN PATENT DOCUMENTS

| EP | 1458148 | 9/2004 |
| TW | 317052 | 10/1997 |
| TW | 441202 B | 6/2001 |
| WO | 03005761 | 1/2003 |
| WO | 2004102848 | 11/2004 |

OTHER PUBLICATIONS

International Search Report—PCT/US08/067939—International Search Authority—European Patent Office—Aug. 24, 2011.
Written Opinion—PCT/US08/067939—International Search Authority—European Patent Office—Aug. 24, 2011.
Taiwan Search Report—TW097124412—TIPO—Nov. 9, 2011.

* cited by examiner

*Primary Examiner* — Gerald Johnson
(74) *Attorney, Agent, or Firm* — Rupit M. Patel (57) ABSTRACT

The disclosure relates to techniques for maintaining minimum quality of service (QoS) communication sessions with a wireless communication device (WCD) over a data-based communication network during a hard handoff between access networks for the WCD. More specifically, the techniques determine whether a closed connection between the WCD and a first access network during a minimum QoS communication session is due to a hard handoff between the first access network and a second access network. In the case of a hard handoff, the techniques maintain open QoS reservations associated with data flows included in the minimum QoS communication session for a predetermined period of time to enable a new connection to be established between the WCD and a second access network. The techniques described herein may especially useful when performing a voice over Internet Protocol (VoIP) call over an Evolution-Data Optimized (EVDO) communication network.

77 Claims, 6 Drawing Sheets

WIRELESS COMMUNICATION DEVICE FOR MAINTAINING MINIMUM QUALITY OF SERVICE (QOS) COMMUNICATION SESSIONS DURING HARD HANDOFFS

CLAIM OF PRIORITY UNDER 35 U.S.C. §119

The present Application for Patent claims priority to Provisional Application No. 60/946,955, entitled "Maintaining Minimum Quality Of Service (Qos) Communication Sessions During Hard Handoffs" filed Jun. 28, 2007, and assigned to the assignee hereof and hereby expressly incorporated by reference herein.

TECHNICAL FIELD

This disclosure relates to maintaining communication sessions with a wireless communication device.

BACKGROUND

Evolution-Data Optimized (EVDO) is a wireless radio broadband data standard evolved directly from the cdma2000 single-carrier Radio Transmission Technology (1xRTT or simply 1x) standard that operates over the Code Division Multiple Access (CDMA) network infrastructure. EVDO comprises an Internet Protocol (IP)-based network and Quality of Service (QoS) mechanisms to support applications that rely on quick set-up and low-latency transmissions over packet-based networks. A recent revision of the EVDO standard, EVDO Revision A, offers higher data rates and higher system capacity, and provides additional QoS support that significantly reduces latency and improves performance of delay-sensitive applications. EVDO RevA may be particularly useful to support minimum QoS communication sessions, such as voice over Internet Protocol (VoIP) calls, and data uploads and downloads with QoS specifications.

A VoIP call over EVDO RevA requires certain minimum QoS guarantees at a traffic channel established between an access terminal (i.e., a wireless communication device) and an access network for the call to sound at least as good as a circuit switched voice call over the 1x standard. QoS guarantees may include limits on the amount of packet loss, delay, and jitter that each data flow within the VoIP call may experience. For example, a VoIP call may include a signaling data flow and a media data flow associated with respective Radio Link Protocol (RLP) flows.

At a particular time or place, if the access network does not have enough resources to guarantee the minimum QoS for a VoIP call with an access terminal, a communication application on the access terminal may get a notification from the protocol stack software that QoS is suspended. The communication application may then drop the VoIP call and may instead try a circuit switched voice call over the 1x standard. In addition to resources on the access network, the QoS for a VoIP call is also dependent on the state of the connection between the access terminal and the access network. If the connection at the radio layer is down, the communication application gets the same notification that QoS is suspended and drops the VoIP call. The reasoning for this is that an access terminal that is not even connected at the radio layer should not unnecessarily take up radio resources of the access network.

A hard handoff of the access terminal between a first access network and a second access network during a VoIP call may cause the connection at the radio layer to go down momentarily while the communication session is being transferred from the first access network to the second access network. Therefore the communication application receives notification that QoS for the VoIP call is suspended, and drops the VoIP call. However, the connection at the radio layer is typically down only temporarily and, if the hard handoff is successful, the connection may be up again with the second access network in a short time.

SUMMARY

In general, the disclosure relates to techniques for maintaining minimum quality of service (QoS) communication sessions with a wireless communication device (WCD) over a data-based communication network during a hard handoff between access networks for the WCD. More specifically, the techniques may determine whether a closed connection that disrupts communication between the WCD and a first access network during a minimum QoS communication session is due to a hard handoff between the first access network and a second access network. In the case of a hard handoff, the techniques may maintain open QoS reservations associated with data flows included in the minimum QoS communication session for a predetermined period of time. This may enable a new connection to be established between the WCD and a second access network.

The techniques may be able to differentiate between three different situations: a closed connection in a successful hard handoff, a closed connection in an unsuccessful hard handoff, and a closed connection due to some other reason. Depending on which of these situations is occurring, the techniques may be able to make an appropriate decision of maintaining or dropping a minimum QoS communication session. For example, a hard handoff is successful if a new connection is established between the WCD and the second access network before the predetermined period of time expires. In this case, the techniques may be able to maintain the minimum QoS communication session during the time after the original connection closes until the new connection is established, and may thereby avoid unnecessary dropping of VoIP calls during hard handoffs. A few frames of the data flow may be lost, but the minimum QoS communication session will remain up and the user will not experience a call drop. A hard handoff fails if the predetermined period of time expires before a new connection can be established between the WCD and the second access network. In that case, the WCD may drop the minimum QoS communication session. In addition, if the closed connection is not due to a hard handoff, the WCD may drop the minimum QoS data communication session.

The techniques described herein may be especially useful when performing a voice over Internet Protocol (VoIP) call over an Evolution-Data Optimized (EVDO) communication network and, more preferably, an EVDO RevA communication network. In that case, the WCD comprises an access terminal in the EVDO communication network and the first and second access networks comprise EVDO access networks. The WCD may comprise any data-enabled wireless device, such as an EVDO phone, an Internet Protocol (IP) phone, a soft phone, a laptop with a wireless connection and a soft phone, a personal digital assistant (PDA) with a wireless connection and a soft phone, or any other device incorporating wireless data communication capabilities.

In one aspect, the disclosure is directed to a method comprising, with a wireless communication device, participating in a minimum QoS communication session over a data-based communication network and receiving a connection close message in response to a closed connection between the wireless communication device and a first access network during the minimum QoS communication session. The method further comprises determining whether the closed connection is due to a hard handoff of the wireless communication device between the first access network and a second access network and, upon determining that the closed connection is due to a hard handoff, maintaining the minimum QoS communication session during the hard handoff.

In another aspect, the disclosure is directed to a wireless communication device comprising a processor configured to execute a communication application that participates in a minimum QoS communication session over a data-based communication network. The processor is further configured to execute a connection module that receives a connection close message in response to a closed connection between the wireless communication device and a first access network during the minimum QoS communication session, and determines whether the closed connection is due to a hard handoff between the first access network and a second access network. The processor is further configured to execute a QoS engine that, when the connection module determines that the closed connection is due to a hard handoff, maintains the minimum QoS communication session during the hard handoff.

In another aspect, the disclosure is directed to a computer program product comprising computer-readable media containing instructions. The instructions cause a computer to, with a wireless communication device, participate in a minimum QoS communication session over a data-based communication network, and receive a connection close message in response to a closed connection between the wireless communication device and a first access network during the minimum QoS communication session. The instructions also cause the computer to determine whether the closed connection is due to a hard handoff of the wireless communication device between the first access network and a second access network and, upon determining that the closed connection is due to a hard handoff, maintain the minimum QoS communication session during the hard handoff.

In a further aspect, the disclosure is directed to a wireless communication device comprising means for participating in a minimum QoS communication session over a data-based communication network, and means for receiving a connection close message in response to a closed connection between the wireless communication device and a first access network during the minimum QoS communication session. The wireless communication device also comprise means for determining whether the closed connection is due to a hard handoff of the wireless communication device between the first access network and a second access network and means for, when the means for determining determines that the closed connection is due to a hard handoff, maintaining the minimum QoS communication session during the hard handoff.

The techniques described in this disclosure may be implemented in hardware, software, firmware, or any combination thereof. If implemented in software, the software may be executed in a computer. The software may be initially stored as instructions, program code, or the like. Accordingly, the disclosure also contemplates a computer program product comprising a computer-readable medium, wherein the computer-readable medium comprises instructions for causing a computer to execute techniques and functions according to this disclosure. Alternatively, if implemented in hardware, such hardware implementations may be digital, analog or both. Aspects of this disclosure may be embodied in the computer-readable medium or a computer program product that comprises the computer-readable medium. The computer program product may include packaging materials.

Additional details of various examples are set forth in the accompanying drawings and the description below. Other features, objects, advantages and examples will become apparent from the description and drawings, and from the claims.

DETAILED DESCRIPTION

Figure 1:
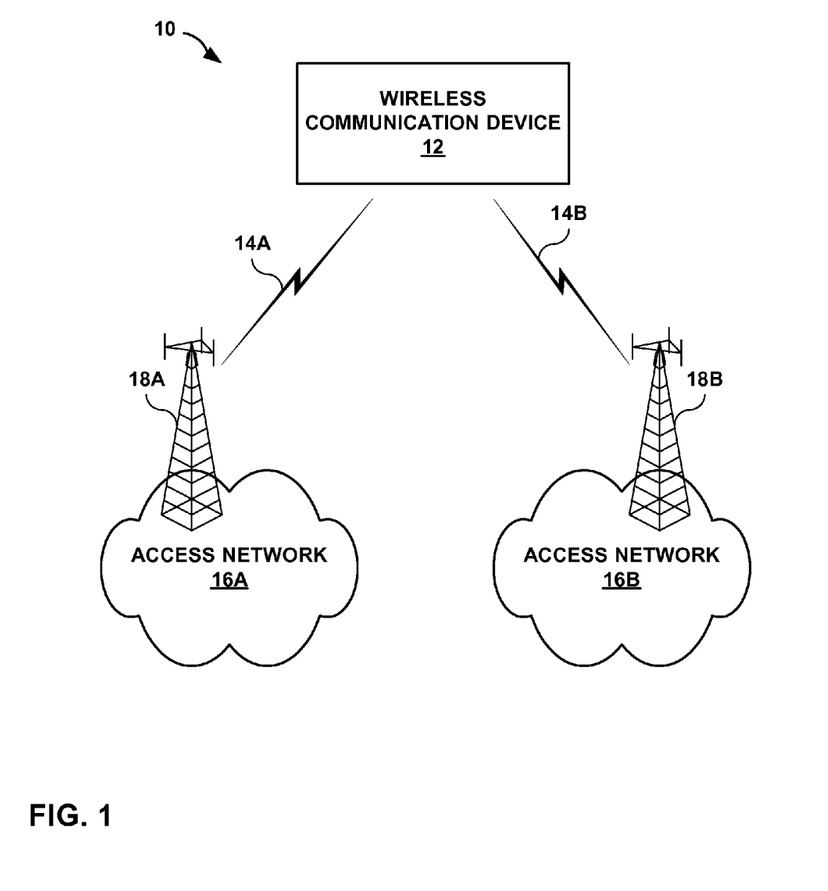
FIG. 1 is a block diagram illustrating an exemplary wireless communication system capable of maintaining minimum quality of service (QoS) communication sessions with a wireless communication device (WCD) during a hard handoff between access networks for the WCD.

FIG. 1 is a block diagram illustrating an exemplary wireless communication system 10 capable of supporting minimum QoS communication sessions with a wireless communication device (WCD) 12 during a hard handoff of WCD 12 between access networks 16A and 16B. As shown in FIG. 1, wireless communication system 10 may include WCD 12 and one or more access networks 16A, 16B. In other aspects, wireless communication system 10 may include a plurality of WCDs and a plurality of access networks. First access network 16A may include a first base station 18A that transmits and receives data signals to and from WCD 12 via traffic channel 14A. Similarly, second access network 16B may include a second base station 18B that transmits and receives data signals to and from WCD 12 via traffic channel 14B. In other aspects, each of access networks 16A, 16B may include a plurality of base stations.

WCD 12 may communicate with one or more of base stations 18A, 18B included in respective access networks 16A, 16B. As WCD 12 moves through a region, WCD 12 may terminate communication with first base station 18A included in first access network 16A and initiate communication with second base station 18B included in second access network 16B. For example, WCD 12 may terminate communication with first base station 18A and initiate communication with second base station 18B based on signal strength or error rate associated with base stations 18A, 18B, using a series of soft and hard handoffs. A hard handoff of WCD 12 between first access network 16A and second access network 16B during a minimum QoS communication session may cause traffic channel 14A to go down momentarily while the communication session is being transferred from first access network 16A to second access network 16B on newly established traffic channel 14B.

Wireless communication system 10 may be designed to support one or more wireless radio access technologies such as code division multiple access (CDMA), CDMA 2000, Wideband-CDMA (W-CDMA), Evolution-Data Optimized (EVDO), or the like. EVDO is a wireless radio broadband data standard evolved directly from the cdma2000 single-carrier Radio Transmission Technology (1xRTT or simply 1x) standard that operates over the CDMA network infrastructure. EVDO comprises an Internet Protocol (IP)-based network and QoS mechanisms to support applications that rely on quick set-up and low-latency transmissions over packet-based networks. A recent revision of the EVDO standard, EVDO Revision A, offers higher data rates and higher system capacity, and provides additional QoS support that significantly reduces latency and improves performance of delay-sensitive applications. EVDO RevA may be particularly useful to support data-based minimum QoS communication sessions, such as voice over Internet Protocol (VoIP) calls, and data uploads and downloads with QoS specifications.

In some aspects, wireless communication system 10 supports a data-based communication network such that WCD 12 may perform data-based minimum QoS communication sessions over the data-based communication network. For example, wireless communication system 10 may support an EVDO communication network and, more preferably, an EVDO RevA communication network. In that case, access networks 16A and 16B may comprise EVDO access networks and WCD 12 may comprise an access terminal operating in the EVDO communication network. For example, WCD 12 may comprise any data-enabled wireless device, such as an EVDO phone, an IP phone, a soft phone, a laptop with a wireless connection and a soft phone, a personal digital assistant (PDA) with a wireless connection and a soft phone, or any other device incorporating wireless data communication capabilities.

A minimum QoS communication session performed over a data-based communication network requires certain minimum QoS guarantees at traffic channel 14A established between WCD 12 and first access network 16A. QoS guarantees may include limits on the amount of packet loss, delay, and jitter that each data flow within the minimum QoS communication session may experience. For example, a VoIP call may include a signaling data flow and a media data flow. As another example, a video-telephony session may include a signaling data flow, a video data flow, and an audio flow. At a particular time or place, if first access network 16A does not have enough resources to guarantee the minimum QoS for each of the data flows within the minimum QoS communication session with WCD 12, a communication application on WCD 12 may receive a notification from WCD 12 that QoS is suspended. The communication application on WCD 12 may then drop the minimum QoS communication session.

In addition to being dependent upon resources on first access network 16A, the QoS for a minimum QoS communication session may also be dependent upon the state of the connection (i.e., traffic channel 14A) between WCD 12 and first access network 16A. When traffic channel 14A goes down, WCD 12 experiences a closed connection with first access network 16A such that WCD 12 cannot participate in a communication session over first access network 16A. Traffic channel 14A may go down temporarily during a hard handoff of WCD 12 between first access network 16A and second access network 16B, or traffic channel 14A may go down for a longer period of time or permanently for some another reason.

In accordance with the techniques described herein, if traffic channel 14A goes down, WCD 12 maintains the minimum QoS communication session when the closed connection of traffic channel 14A is due to a hard handoff between first access network 16A and second access network 16B. More specifically, WCD 12 determines whether the closed connection between WCD 12 and first access network 16A during a minimum QoS communication session is due to a hard handoff between first access network 16A and second access network 16B. In the case of a hard handoff, WCD 12 maintains open QoS reservations associated with data flows included in the minimum QoS communication session for a predetermined period of time to enable a new connection (i.e., traffic channel 14B) to be established between WCD 12 and second access network 16B. Open QoS reservations comprise those reservations currently in use for the minimum QoS communication session.

The techniques described herein allow WCD 12 to differentiate between three different situations: a closed connection in a successful hard handoff, a closed connection in an unsuccessful hard handoff, and a closed connection due to some other reason. Depending on which of these situations is occurring, the techniques allow WCD 12 to make the appropriate decision of maintaining or dropping a minimum QoS communication session. For example, a hard handoff is successful if a new connection is established between WCD 12 and second access network 16B before the predetermined period of time expires. In this case, the techniques allow WCD 12 to maintain the minimum QoS communication session during the time after the original connection closes until the new connection is established. A few frames of the data flow may be lost, but the minimum QoS communication session will remain up and the user will not experience a call drop. A hard handoff fails if the predetermined period of time expires before a new connection can be established between WCD 12 and second access network 16B. In that case, WCD 12 drops the minimum QoS communication session. In addition, if the closed connection is not due to a hard handoff, WCD 12 drops the minimum QoS communication session.

The remainder of this disclosure will be described in relation to VoIP calls over an exemplary EVDO communication network. However, this disclosure should not be limited in any way by this example. The techniques described herein may be similarly utilized in other data-based communication networks capable of supporting minimum QoS communication sessions with wireless communication devices.

Figure 2:
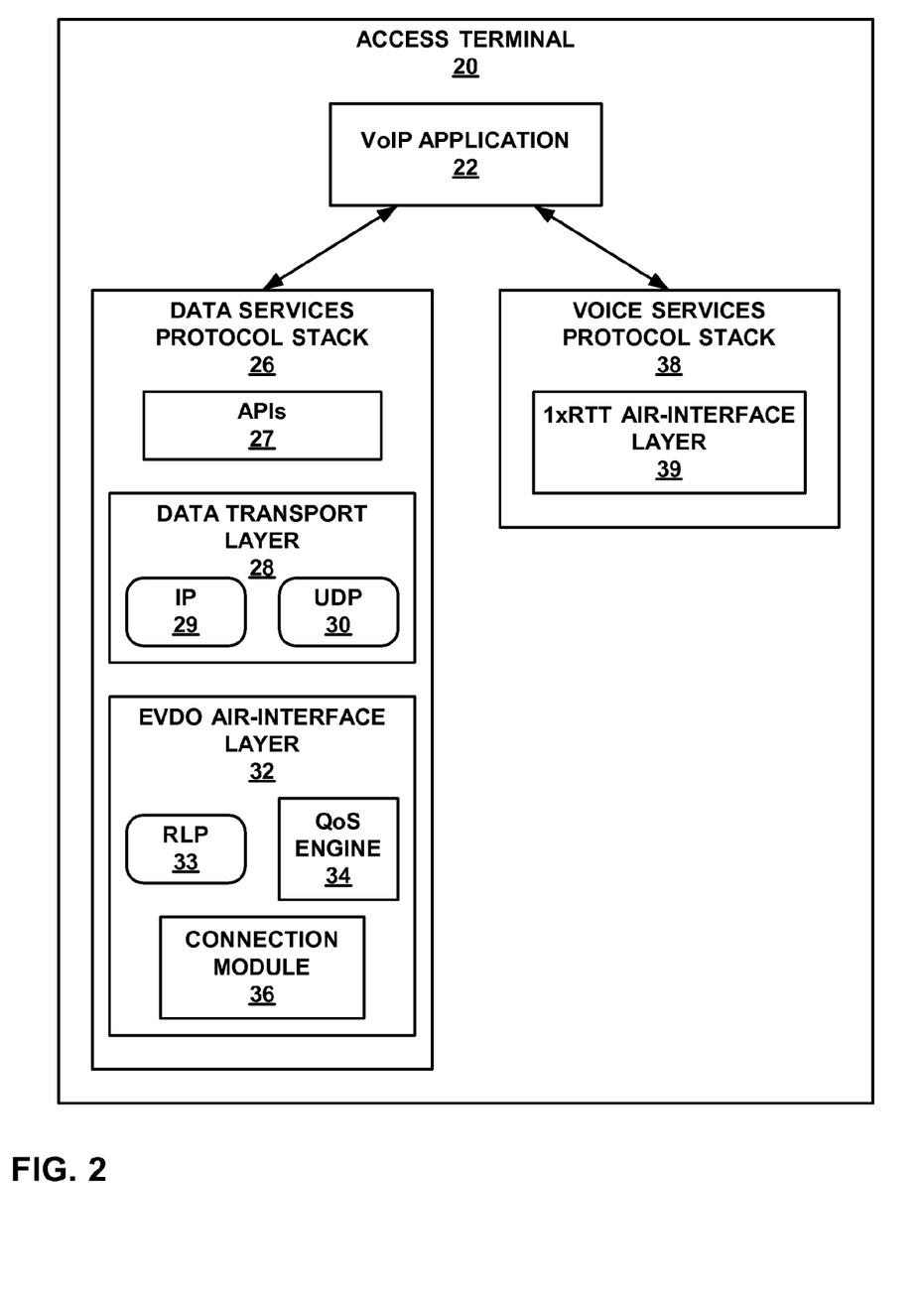
FIG. 2 is a block diagram illustrating an access terminal within an Evolution-Data Optimized (EVDO) RevA communication network.

FIG. 2 is a block diagram illustrating an access terminal 20 operating over an EVDO RevA communication network. Access terminal 20 may comprise a wireless communication device substantially similar to WCD 12 from FIG. 1. For example, access terminal 20 may comprise an EVDO phone, an IP phone, a soft phone, a laptop with a wireless connection and a soft phone, or a PDA with a wireless connection and a soft phone. As illustrated in FIG. 2, access terminal 20 may include a VoIP application 22 capable of interacting with a data services protocol stack 26 and a voice services protocol stack 38. VoIP application 22 may perform a VoIP call over EVDO RevA established by the data services protocol stack 26 or a circuit switched voice call over 1x established by the voice services protocol stack 38.

Data services protocol stack 26 includes application programming interfaces (APIs) 27, a data transport layer 28, and an EVDO air-interface layer 32. EVDO air-interface layer 32 includes Radio Link Protocol (RLP) 33, a QoS engine 34, and a connection module 36. EVDO air-interface layer 32 establishes a radio-based communication link, e.g., a traffic channel, between access terminal 20 and a base station included in an EVDO access network. EVDO air-interface layer 32 also governs data signals transmitted and received by access terminal 20. Data transport layer 28 uses User Datagram Protocol (UDP) 30 over IP 29 to facilitate the transfer of a VoIP call from access terminal 20 to another communication device via the access network. In other aspects, data transport layer 28 may alternatively use Transmission Control Protocol (TCP) over IP 29 to facilitate the transfer of data signals from access terminal 20 to another communication device. APIs 27 within data services protocol stack 26 are used to control the protocol stack software implemented by data transport layer 28 and EVDO air-interface layer 32. In this example, voice services protocol stack 38 includes a 1xRTT air-interface layer 39 that establishes a radio-based communication link, e.g., a traffic channel, between access terminal 20 and a base station included in an access network. 1xRTT air-interface layer 39 also governs voice signals transmitted and received by access terminal 20.

VoIP application 22, the components included in data services protocol stack 26, and the components included in voice services protocol stack 38 may be implemented in hardware, software, firmware, or any combination thereof. If implemented in software, the components may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. The software may be initially stored as instructions, program code, or the like. Accordingly, the disclosure also contemplates a computer program product comprising a computer-readable medium, wherein the computer-readable medium comprises instructions for causing a computer to execute techniques and functions according to this disclosure.

More specifically, access terminal 20 may include one or more processors to execute VoIP application 22, the components included in data services protocol stack 26, and the components included in voice service protocol stack 38. In one aspect, access terminal 20 may include a single processor configured to execute VoIP application 22, the components included in data services protocol stack 26, and the components included in voice services protocol stack 38. In another aspect, access terminal 20 may include a first processor configured to execute VoIP application 22, APIs 27 and data transport layer 28, and a second processor configured to execute EVDO air-interface layer 32 including QoS engine 34 and connection module 36. Either the first processor, the second processor, or a third processor may be configured to execute voice services protocol stack 38 included 1xRTT air-interface layer 39. In a further aspect, access terminal 20 may includes a first processor configured to execute VoIP application 22, a second processor configured to execute APIs 27 and data transport layer 28, and a third processor configured to execute EVDO air-interface layer 32 including QoS engine 34 and connection module 36. Either the second processor, the third processor, or a fourth processor may be configured to execute voice services protocol stack 38 included 1xRTT air-interface layer 39.

A VoIP call over EVDO RevA established by data services protocol stack 26 requires certain minimum QoS guarantees at a traffic channel between access terminal 20 and a first access network. QoS guarantees may include limits on the amount of packet loss, delay, and jitter that each data flow within the VoIP call may experience. A VoIP call typically includes a signaling data flow and a media data flow associated with respective RLP flows received and transmitted by RLP 33. At a particular time or place, if the first access network does not have enough resources to guarantee the minimum QoS for the VoIP call with access terminal 20, QoS engine 34 receives notice from the first access network that the first access network cannot support the requested QoS for the VoIP call. VoIP application 22 then receives a notification from QoS engine 34 via APIs 27 that QoS is suspended. VoIP application 22 may then attempt a circuit switched voice call over 1x established by voice services protocol stack 38 instead of the VoIP call over EVDO RevA.

The QoS for a VoIP call is also dependent on the state of the connection (e.g., traffic channel) between access terminal 20 and the first access network. During a VoIP call over EVDO RevA, connection module 36 receives a connection close message from the first access network in response to a closed connection between access terminal 20 and the first access network. In some cases, the closed connection may occur due to a hard handoff between the first access network and a second access network, in which case a new connection is expected to be established shortly between access terminal 20 and the second access network. In other cases, the closed connection may be due to other reasons in which a new connection is not expected to be established. However, when a hard handoff is in progress, the connection close message from the first access network is bundled with a traffic channel assignment (TCA) message from the second access network. In other words, the connection close message sent from the first access network is included in the same message as the TCA message sent from the second access network to set up a new traffic channel with access terminal 20. Therefore, QoS engine 34 may determine whether the closed connection is due to a hard handoff between the first access network and a second access network of access terminal 20 based on whether the connection close message is bundled with a TCA message.

When QoS engine 34 determines that the closed connection between access terminal 20 and the first access network during a VoIP call is due to a hard handoff between the first access network and the second access network, QoS engine 34 maintains open QoS reservations associated with the data flows included in the VoIP call in accordance with attributes received from RLP 33. Open QoS reservations comprise those reservations currently in use for the VoIP call. Any closed QoS reservations for the VoIP call will remain closed.

The EVDO RevA standard includes a RLP attribute called ReservationKKIdle for each data flow within a VoIP call that determines whether the QoS state is tied to the connection state. For data flows on which signaling data is transported, the values of ReservationKKIdle will be set to zero such that a QoS reservation associated with the signaling data flow will remain open regardless of the state of the connection between access terminal 20 and the first access network. However, for data flows on which media data is transported, the values of ReservationKKIdle will be set to non-zero such that in a conventional access terminal a QoS reservation associated with the media data flow will be closed automatically when the connection between access terminal 20 and the first access network goes down.

In accordance with this disclosure, instead of automatically closing the QoS reservation when the ReservationKKIdle attribute for a given data flow included in the VoIP call has a nonzero value, in the case of a hard handoff QoS engine 34 maintains the open QoS reservation for the media data flow having a nonzero ReservationKKIdle attribute for a predetermined period of time to enable the new connection to be established. The operation of maintaining the open QoS reservations for the VoIP call is described in greater detail in FIG. 3 below. QoS engine 34 continues to analyze QoS reservations until the QoS reservations for all of the media data flows included in the VoIP flow are maintained. In this way, QoS engine 34 keeps the QoS reservations open during the hard handoff and does not send any notification to VoIP application 22 regarding the closed connection between access terminal 20 and the first access network. Therefore, VoIP application 22 will not drop the VoIP call during the hard handoff, and need not instead try a circuit switched voice call over the 1x standard.

When the closed connection is not due to a hard handoff, QoS engine 34 closes open QoS reservations associated with the media data flows (i.e., ReservationKKIdle attributes with nonzero values) included in the VoIP call. QoS engine 34 then notifies VoIP application 22 that the QoS for each of the media data flows is suspended. QoS engine 34 continues to analyze QoS reservations until QoS for all of the media data flows included in the VoIP flow are suspended. VoIP application 22 may then drop the VoIP call. As described above, a VoIP call typically only has one media data flow such that VoIP application 22 may drop the VoIP call immediately in response to the notification from QoS engine 34.

As an alternative example, a video-telephony session typically has two media flows, a video data flow and an audio flow. In one case, such that a communication application may not drop the video-telephony session until after receiving notification that QoS for both the video data flow and the audio flow is suspended. In another case, a communication application may drop the video-telephony session after receiving notification that QoS for either the video data flow or the audio flow is suspended. Whether the video-telephony session is dropped after the loss of one or both of the media flows may depend on a user setting. Some users may want the video-telephony session to stop if either the video or audio is lost; other users may want the video-telephony session to continue as only an audio call or only video even if the other media flow is lost.

Figure 3:
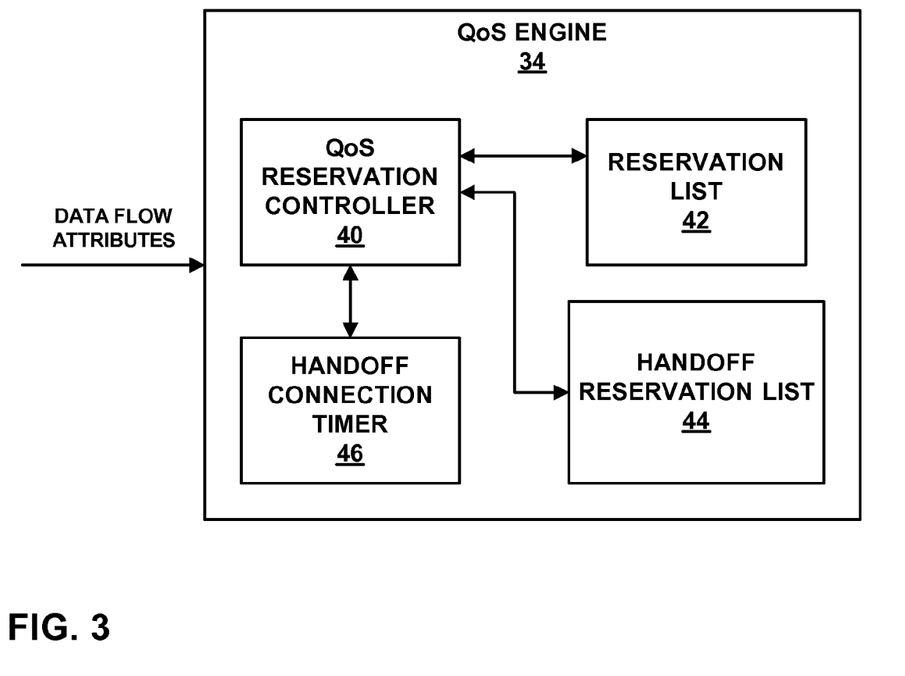
FIG. 3 is a block diagram illustrating a QoS engine included in the access terminal from FIG. 2 in greater detail.

FIG. 3 is a block diagram illustrating QoS engine 34 included in access terminal 20 from FIG. 2 in greater detail. QoS engine 34 receives attributes from RLP 33 for each data flow included in a VoIP call. For example, QoS engine 34 may receive the ReservationKKIdle attribute for each of the data flows within the VoIP call. As described above, a VoIP call includes a signaling data flow and a media data flow associated with respective RLP flows received or transmitted by RLP 33. As illustrated in FIG. 3, QoS engine 34 includes a QoS reservation controller 40, a reservation list 42, a handoff reservation list 44, and a handoff connection timer 46.

Once QoS engine 34 determines that the closed connection for the VoIP call is due to a hard handoff as described in reference to FIG. 2, QoS reservation controller 40 starts handoff connection timer 46. Handoff connection timer 46 may be set to run for a predetermined period of time, such as a typical amount of time necessary to perform a hard handoff between a first access network and a second access network in an EVDO RevA communication network.

After starting handoff connection timer 46, QoS reservation controller 40 retrieves a QoS reservation associated with a data flow included in the VoIP call from reservation list 42. Reservation list 42 may be maintained by QoS engine 34 to store a list of QoS reservations associated with the data flows included in a VoIP call with access terminal 20. Upon retrieving QoS reservation for the given data flow, QoS reservation controller 40 determines whether the QoS reservation is open and, if open, whether the ReservationKKIdle attribute associated with the data flow has a nonzero value (i.e., the data flow comprises a media data flow). QoS reservation controller 40 then maintains the open QoS reservation within reservation list 42 for the media data flow included in the VoIP call. QoS reservation controller 40 also adds the QoS reservation for that media data flow to handoff reservation list 44. Handoff reservation list 44 may also be maintained by QoS engine 34 to temporarily store a list of open QoS reservations associated with media data flows included in a VoIP call during a hard handoff. QoS reservation controller 40 then returns to reservation list 42, and continues to retrieve and analyze the remaining QoS reservations within reservation list 42.

QoS reservation controller 40 simultaneously monitors the establishment of the new connection between access terminal 20 and the second access network in relation to handoff connection timer 46. When the new connection is established while handoff connection timer 46 is still running, QoS reservation controller 40 stops handoff connection timer 46. QoS reservation controller 40 then removes all the QoS reservations from handoff reservation list 44 because these QoS reservations are no longer waiting for the connection to be established between access terminal 20 and the second access network. In this way, QoS engine 34 keeps the QoS reservations within reservation list 42 open during the hard handoff and does not send any notification to VoIP application 22 regarding the closed connection between access terminal 20 and the first access network. Therefore, VoIP application 22 will not drop the VoIP call during the hard handoff.

When handoff connection timer 46 expires before the new connection can be established, QoS reservation controller 40 retrieves a QoS reservation associated with a given media data flow included in the VoIP call from handoff reservation list 44. QoS reservation controller 40 closes the open QoS reservation within reservation list 42 for the media data flow, removes the open QoS reservation from handoff reservation list 44, and notifies VoIP application 22 that the QoS for that media data flow is suspended. QoS reservation controller 40 then returns to handoff reservation list 44, and continues to retrieve the remaining QoS reservations from handoff reservation list 44, close the QoS reservations within reservation list 42, and remove the QoS reservation from handoff reservation list 44 until handoff reservation list 44 is empty. VoIP application 22 may then drop the VoIP call.

Furthermore, when Qos engine 34 determines that the closed connection is not due to a hard handoff, as described above, QoS reservation controller 40 does not start handoff connection timer 46, and does not maintain open QoS reservations for media data flows. Instead, QoS reservation controller 40 retrieves a QoS reservation associated with a data flow included in the VoIP call from reservation list 42. QoS reservation controller 40 then determines whether the QoS reservation is open and, if open, whether the ReservationKKIdle attribute associated with the data flow has a nonzero value (i.e., the data flow comprises a media data flow). QoS reservation controller 40 closes the open QoS reservation for the media data flow included in the VoIP call and notifies VoIP application 22 that the QoS for that media data flow is suspended. QoS reservation controller 40 then returns to reservation list 42, and continues to retrieve and close the remaining QoS reservations within reservation list 42. VoIP application 22 may then drop the VoIP call.

Figure 4A:
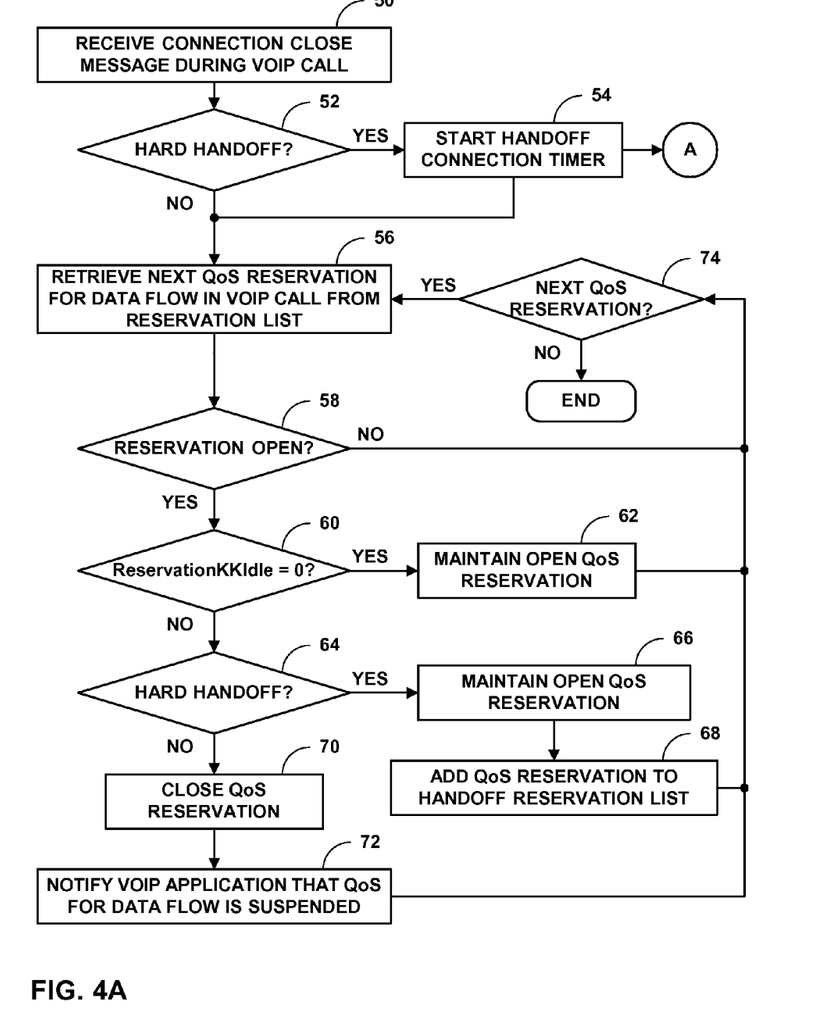
FIGS. 4A and 4B are flowcharts illustrating an exemplary operation of the access terminal during a hard handoff between access networks for the access terminal.
Figure 4B:
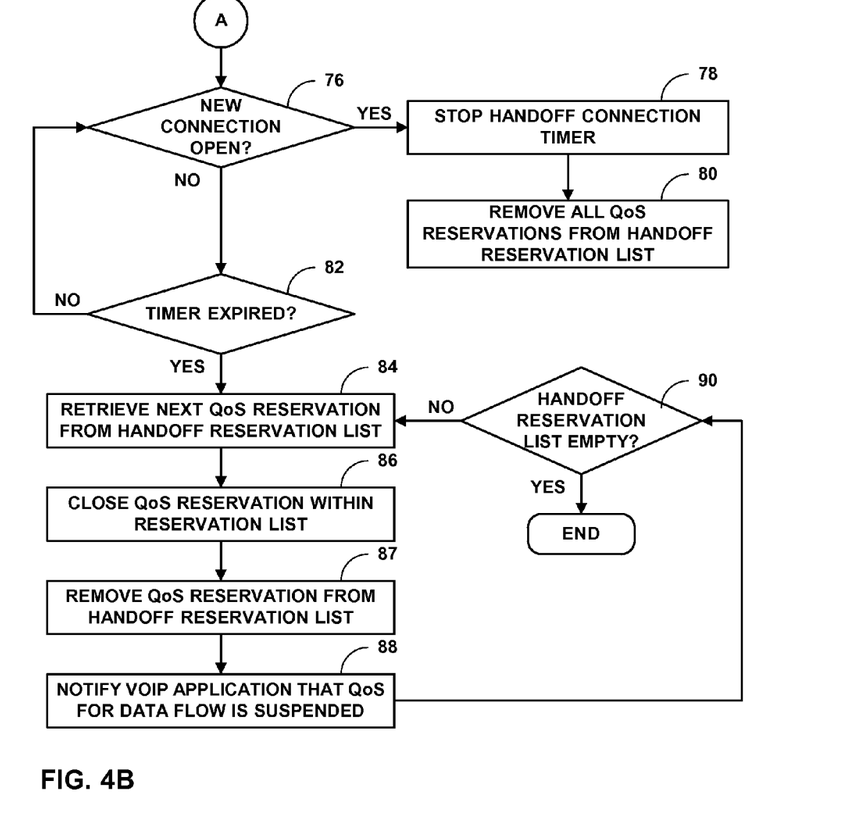

FIGS. 4A and 4B are flowcharts illustrating an exemplary operation of access terminal 20 during a hard handoff between access networks in an EVDO communication network. The flowchart illustrated in FIG. 4A describes an operation of access terminal 20 after receiving a connection close message from a first access network. The flowchart illustrated in FIG. 4B describes an operation of access terminal 20 while a handoff connection timer is running. The operations of FIGS. 4A and 4B will be described in reference to access terminal 20 from FIG. 2 and QoS engine 34 from FIG. 3.

As illustrated in FIG. 4A, connection module 36 implemented in EVDO air-interface layer 32 within access terminal 20 receives a connection close message in response to a closed connection between access terminal 20 and a first access network during a VoIP call with access terminal 20 over an EVDO communication network (50). QoS engine 34 implemented in EVDO air-interface layer 32 then determines whether the closed connection is due to a hard handoff between the first access network and a second access network of access terminal 20 (52). For example, QoS engine 34 may determine that the closed connection is due to a hard handoff when the connection close message is bundled or included with a TCA message.

If QoS engine 34 determines that the closed connection is due to a hard handoff (YES branch of 52), then QoS reservation controller 40 starts handoff connection timer 46 (54). Once handoff connection timer 46 is running, access terminal 20 may operate in accordance with FIG. 4B, described in more detail below. After starting handoff connection timer 46 or if QoS engine 34 determines that the closed connection is not due to a hard handoff (NO branch of 52), QoS reservation controller 40 retrieves a QoS reservation associated with a data flow included in the VoIP call from reservation list 42 (56).

QoS reservation controller 40 then determines whether the QoS reservation associated with the data flow is open (58). If the QoS reservation is closed (NO branch of 58) and reservation list 42 includes a next QoS reservation (NO branch of 74), QoS reservation controller 40 retrieves the next QoS reservation associated with another data flow included in the VoIP call from reservation list 42 (56). If the QoS reservation is closed (NO branch of 58) and reservation list 42 does not include a next QoS reservation (YES branch of 74), QoS reservation controller 40 stops analyzing the QoS reservations. As described above, a VoIP call includes a signaling data flow and a media data flow associated with respective RLP flows. Therefore, in some cases reservation list 42 may only include two QoS reservations, one for each data flow, for any given VoIP call.

If the QoS reservation is open (YES branch of 58), QoS reservation controller 40 determines whether the ReservationKKIdle attribute associated with the data flow included in the VoIP call has a nonzero value (60). ReservationKKIdle may be set to a zero value for a data flow that includes signaling traffic and set to a nonzero value for a data flow that includes media traffic. If the ReservationKKIdle attribute has a zero value (YES branch of 60), QoS reservation controller 40 maintains the open QoS reservation within reservation list 42 for the signaling data flow included in the VoIP call regardless of the state of the connection between access terminal 20 and the first access network (62). QoS reservation controller 40 then returns to reservation list 42. If reservation list 42 includes a next QoS reservation (NO branch of 74), QoS reservation controller 40 retrieves the next QoS reservation associated with another data flow included in the VoIP call from reservation list 42 (56). If reservation list 42 does not include a next QoS reservation (YES branch of 74), QoS reservation controller 40 stops analyzing the QoS reservations.

If the ReservationKKIdle attribute has a nonzero value (NO branch of 60) and the closed connection was due to a hard handoff (YES branch of 64), QoS reservation controller 40 maintains the open QoS reservation within reservation list 42 for the media data flow (66). QoS reservation controller 40 then adds the QoS reservation for that media data flow to handoff reservation list 44 (68). In this way, QoS reservation controller 40 keeps the QoS reservation within reservation list 42 open during the hard handoff and does not send any notification to VoIP application 22 regarding the closed connection between access terminal 20 and the first access network. Since VoIP application 22 is unaware of the closed connection, VoIP application 22 will not drop the VoIP call during the hard handoff. QoS reservation controller 40 then returns to reservation list 42. If reservation list 42 includes a next QoS reservation (NO branch of 74), QoS reservation controller 40 retrieves the next QoS reservation associated with another data flow included in the VoIP call from reservation list 42 (56). If reservation list 42 does not include a next QoS reservation (YES branch of 74), QoS reservation controller 40 stops analyzing the QoS reservations.

If the ReservationKKIdle attribute has a nonzero value (NO branch of 60) but the closed connection was not due to a hard handoff (NO branch of 64), QoS reservation controller 40 closes the open QoS reservation within reservation list 42 for the data flow (70). QoS reservation controller 40 then notifies VoIP application 22 that the QoS for that data flow is suspended (72). QoS reservation controller 40 then returns to reservation list 42. If reservation list 42 includes a next QoS reservation (NO branch of 74), QoS reservation controller 40 retrieves the next QoS reservation associated with another data flow included in the VoIP call from reservation list 42 (56). If reservation list 42 does not include a next QoS reservation (YES branch of 74), QoS reservation controller 40 stops analyzing the QoS reservations. When QoS for all the media data flows included in the VoIP call are suspended, the VoIP application 22 drops the VoIP call. As described above, a VoIP call typically only has one media data flow such that VoIP application 22 drops the VoIP call immediately in response to the notification from QoS reservation controller 40 that QoS for the single media data flow is suspended.

As illustrated in FIG. 4A, once QoS engine 34 determines that the closed connection is due to a hard handoff and QoS reservation controller 40 starts handoff connection timer 46, QoS reservation controller 40 maintains the open QoS reservations within reservation list 42 for the data flows included in the VoIP call with ReservationKKIdle attributes equal to nonzero values. As illustrated in FIG. 4B, QoS reservation controller 40 simultaneously monitors the establishment of a new connection between access terminal 20 and the second access network in relation to handoff connection timer 46. QoS reservation controller 40 determines whether the new connection (e.g., traffic channel) is open between access terminal 20 and the second access network (76). If the new connection has been established (YES branch of 76), QoS reservation controller 40 stops handoff connection timer 46 (78). QoS reservation controller 40 then removes all the QoS reservations from handoff reservation list 44 (80) because these QoS reservations are no longer waiting for the connection to be established between access terminal 20 and the second access network.

If the new connection has not yet been established and so is not yet open (NO branch of 76), QoS reservation controller 40 next determines whether handoff connection timer 46 has expired (82). Handoff connection timer 46 may be set to run for a predetermined period of time, such as a typical amount of time necessary to perform a hard handoff between a first access network and a second access network in an EVDO communication network. If handoff connection timer 46 has not expired (NO branch of 82), QoS reservation controller continues to monitor the status of the new connection and handoff connection timer 46.

If handoff connection timer 46 has expired before the new connection could be established (YES branch of 82), QoS reservation controller 40 retrieves a QoS reservation associated with a media data flow included in the VoIP call from handoff reservation list 44 (84). QoS reservation controller 40 closes the open QoS reservation within reservation list 42 for the media data flow (86) and removes the open QoS reservation from handoff reservation list 44 (87). QoS reservation controller 40 then notifies VoIP application 22 that the QoS for that media data flow is suspended (88). QoS reservation controller 40 then returns to handoff reservation list 44. If handoff reservation list 44 is not empty (NO branch of 90), QoS reservation controller 40 retrieves the next QoS reservation associated with another media data flow included in the VoIP call from handoff reservation list 42 (84). If handoff reservation list 44 is empty (YES branch of 90), QoS reservation controller 40 has closed all of the QoS reservations within reservation list 42 and has removed all of the QoS reservation from handoff reservation list 44. When QoS for all the media data flows included in the VoIP call are suspended, the VoIP application 22 drops the VoIP call. As described above, a VoIP call typically only has one media data flow such that VoIP application 22 drops the VoIP call immediately in response to the notification from QoS reservation controller 40 that QoS for the single media data flow is suspended.

Figure 5:
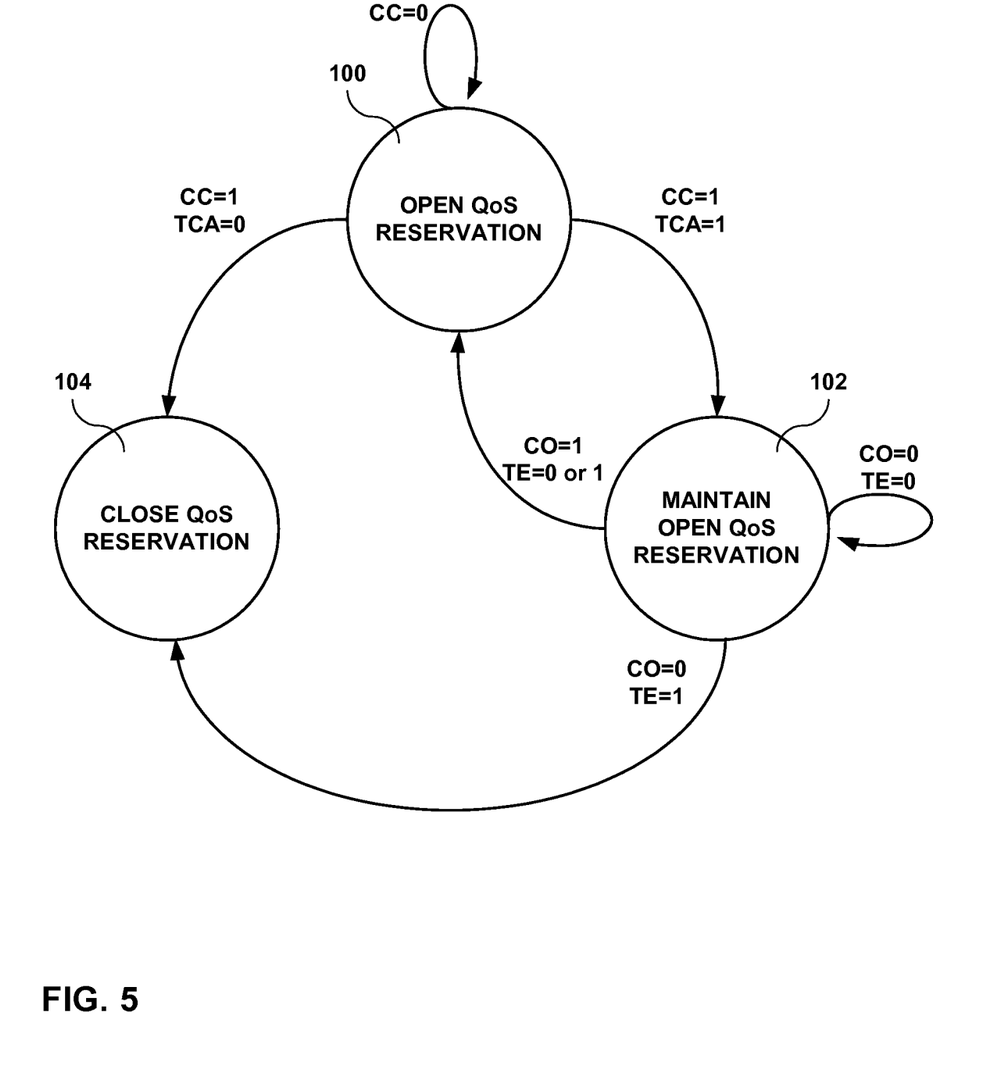
FIG. 5 is a state diagram illustrating movement between different QoS states in response to triggers received within the access terminal.

FIG. 5 is a state diagram illustrating movement between different QoS states in response to triggers received within access terminal 20. The state system illustrated in FIG. 5 includes an open QoS reservation state 100, a maintain open QoS reservation state 102, and a close QoS reservation state 104. During a VoIP call with access terminal 20 over an EVDO communication network, the open QoS reservations associated with the media data flows included in the VoIP call are in the open QoS reservation state 100. During the VoIP call, the open QoS reservations will stay in the open QoS reservation state 100 as long as a closed connection does not occur between access terminal 20 and a first access network (CC=0).

However, if a closed connection does occur between access terminal 20 and the first access network (CC=1) and the connection close message is not bundled with a TCA message (TCA=0), the open QoS reservations will leave the open QoS reservation state 100 and enter the close QoS reservation state 104. Upon entering the close QoS reservation state 104, the open QoS reservations are closed and VoIP application 22 included in access terminal 20 drops the VoIP call. If a closed connection does occur between access terminal 20 and the first access network (CC=1) and the connection close message is bundled with a TCA message (TCA=1), the open QoS reservations will leave the open QoS reservation state 100 and enter the maintain QoS reservation state 102.

The open QoS reservations will stay in the maintain QoS reservation state 102 as long as handoff connection timer 46 has not expired (TE=0) and a new connection has not opened between access terminal 20 and a second access network (CO=0). If handoff connection time 46 expires (TE=1) before the new connection can be established (CO=0), the open QoS reservations will leave the maintain open QoS reservation state 102 and enter the close QoS reservation state 104. Upon entering the close QoS reservation state 104, the open QoS reservations are closed and VoIP application 22 included in access terminal 20 drops the VoIP call. If the new connection is established between access terminal 20 and the second access network (CO=1) either before handoff connection timer 46 expires (TE=0) or when handoff connection timer 46 expires (TE=1), the open QoS reservations will leave the maintain open QoS reservation state 102 and reenter the open QoS reservation state 100. In this way, the maintain open QoS reservation state 102 keeps the QoS reservation open during the hard handoff and does not send any notification to VoIP application 22 included in access terminal 20 regarding the closed connection between access terminal 20 and the first access network. Therefore, VoIP application 22 will not drop the VoIP call during the hard handoff.

The techniques of this disclosure are directed to maintaining minimum QoS communication sessions with a WCD over a data-based communication network during a hard handoff between access networks for the WCD. More specifically, the techniques determine whether a closed connection between the WCD and a first access network during a minimum QoS communication session is due to a hard handoff between the first access network and a second access network. In the case of a hard handoff, the techniques maintain open QoS reservations associated with data flows included in the minimum QoS communication session for a predetermined period of time to enable a new connection to be established between the WCD and a second access network.

The techniques are able to differentiate between three different situations: a closed connection in a successful hard handoff, a closed connection in an unsuccessful hard handoff, and a closed connection due to some other reason. Depending on which of these situations is occurring, the techniques are able to make the appropriate decision of maintaining or dropping a minimum QoS communication session. For example, a hard handoff is successful if a new connection is established between the WCD and the second access network before the predetermined period of time expires. In this case, the techniques are able to maintain the minimum QoS communication session during the time after the original closed connections until the new connection is established. A few frames of the data flow may be lost, but the minimum QoS communication session will remain up and the user will not experience a call drop. A hard handoff fails if the predetermined period of time expires before a new connection can be established between the WCD and the second access network. In that case, the WCD drops the minimum QoS communication session. In addition, if the closed connection is not due to a hard handoff, the WCD drops the minimum QoS data communication session.

The techniques described herein may be especially useful when performing a VoIP call over an EVDO communication network and, more preferably, an EVDO RevA communication network. In that case, the WCD comprises an access terminal in the EVDO communication network and the first and second access networks comprise EVDO access networks. The WCD may comprise any data-enabled wireless device, such as an EVDO phone, an IP phone, a soft phone, a laptop with a wireless connection and a soft phone, a PDA with a wireless connection and a soft phone, or any other device incorporating wireless data communication capabilities.

The techniques described herein may be implemented in hardware, software, firmware, or any combination thereof. If implemented in software, the techniques may be realized at least in part by one or more stored or transmitted instructions or code on a computer-readable medium of a computer program product. Computer-readable media may include computer storage media, communication media, or both, and may include any medium that facilitates transfer of a computer program from one place to another. A storage media may be any available media that can be accessed by a computer. A computer program product may include packaging materials.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

The code associated with a computer-readable medium of a computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Nevertheless, various modifications may be made to the techniques described without departing from the scope of the following claims.

The invention claimed is:

1. A method comprising:
receiving a connection close message in response to a closed connection between a wireless communication device and a first access network during a minimum quality of service (QoS) communication session over a data-based communication network;
determining whether the closed connection is due to a hard handoff of the wireless communication device between the first access network and a second access network; and
based at least in part on determining that the closed connection is due to a hard handoff, maintaining the minimum QoS communication session during the hard handoff.

2. The method of claim 1, wherein determining that the closed connection is due to a hard handoff comprises determining that the connection close message is bundled with a traffic channel assignment (TCA) message received from the second access network.

3. The method of claim 1, further comprising dropping the minimum QoS communication session upon determining that the closed connection is not due to a hard handoff.

4. The method of claim 3, wherein dropping the minimum QoS communication session when the closed connection is not due to a hard handoff comprises:
closing an open QoS reservation associated with a data flow included in the minimum QoS communication session; and
notifying a communication application within the wireless communication device that QoS for the minimum QoS communication session is suspended.

5. The method of claim 1, further comprising:
maintaining the minimum QoS communication session when the hard handoff between the first access network and the second access network is successful; and
dropping the minimum QoS communication session when the hard handoff between the first access network and the second access network fails.

6. The method of claim 1, wherein maintaining the minimum QoS communication session during the hard handoff comprises maintaining open QoS reservations associated with data flows included in the minimum QoS communication session during the hard handoff.

7. The method of claim 1, wherein maintaining the minimum QoS communication session during the hard handoff comprises:
starting a handoff connection timer upon determining that the closed connection is due to the hard handoff;
maintaining an open QoS reservation within a reservation list associated with data flows included in the minimum QoS communication session; and
adding the open QoS reservation to a handoff reservation list while the handoff connection timer is running.

8. The method of claim 7, wherein the method further comprises determining whether the QoS of the QoS reservation is tied to the connection state, and wherein maintaining the open QoS reservation comprises:
retrieving from the reservation list a QoS reservation associated with one of said data;
determining whether the QoS reservation is open; and
upon determining that the QoS reservation is open, maintaining the open QoS reservation within the reservation list during the hard handoff when the QoS of the QoS reservation is determined as tied to the connection state.

9. The method of claim 8, further comprising adding the open QoS reservation to the handoff reservation list when the QoS of the QoS reservation is determined as tied to the connection state.

10. The method of claim 9, wherein data flows included in the minimum QoS communication session have a Radio Link Protocol (RLP) attribute called ReservationKKldle set to a zero value for a data flow that includes signaling traffic and set to a nonzero value for a data flow that includes media traffic, and wherein determining whether the QoS is tied to the connection state is based on the ReservationKKldle attribute.

11. The method of claim 7, further comprising:
stopping the handoff connection timer once a connection is established between the wireless communication device and the second access network; and
removing the open QoS reservation from the handoff reservation list.

12. The method of claim 7, further comprising:
closing the open QoS reservation within the reservation list when the handoff connection timer expires before a connection is established between the wireless communication device and the second access network;
removing the open QoS reservation from the handoff reservation list;
notifying a communication application within the wireless communication device that QoS for the minimum QoS communication session is suspended; and
dropping the minimum QoS communication session.

13. The method of claim 1, wherein the minimum QoS communication session comprises a voice over Internet Protocol (VoIP) call.

14. The method of claim 1, wherein the data-based communication network comprises an Evolution-Data Optimized (EVDO) communication network utilizing one of an EVDO Revision 0 standard or an EVDO Revision A standard, and wherein the wireless communication device comprises an access terminal in the EVDO communication network and the first and second access networks comprise EVDO access networks.

15. The method of claim 1, wherein the wireless communication device comprises one of an Evolution-Data Optimized (EVDO) phone, an Internet Protocol (IP) phone, a soft phone, a laptop with a wireless connection and a soft phone, or a personal digital assistant (PDA) with a wireless connection and a soft phone.

16. The method of claim 1, further comprising monitoring an establishment of a connection between the wireless communication device and the second access network, wherein maintaining the open QoS reservation is based, at least in part, on a result of the monitoring.

17. The method of claim 16, wherein maintaining the open QoS reservation includes initiating a hand-off time counting having an expiration and, in response to the expiration occurring prior to the monitoring indicating the establishment of the connection, removing the open QoS reservation.

18. The method of claim 1, further comprising monitoring an establishment of a connection between the wireless communication device and the second access network, wherein the open QoS reservation includes an attribute indicating whether a state of the QoS is tied to a state of the connection between the wireless communication device and the first access network, wherein maintaining the open QoS reservation includes detecting the attribute and, if the attribute indicates the open QoS reservation is tied to the state of the connection, basing the maintaining at least in part on a result of the monitoring, else maintaining the open QoS reservation.

19. The method of claim 18, further comprising initiating, in response to determining the connection closing is due to a hard hand-off, a hand-off timing having an expiration, wherein basing the maintaining at least in part on the result of the monitoring includes, in response to the expiration occurring prior to the monitoring indicating the establishment of the connection, removing the open QoS reservation.

20. The method of claim 1, further comprising monitoring an establishment of a connection between the wireless communication device and the second access network,
wherein the session is associated with an application having a plurality of data flows, each data flow having an open QoS reservation, the open QoS reservation having an attribute indicating whether a state of the QoS is tied to a state of the connection between the wireless communication device and the first access network,
wherein maintaining the open QoS reservations includes detecting the attribute and, if the attribute indicates the open QoS reservation is tied to the state of the connection , basing the maintaining, at least in part, on a result of the monitoring, else maintaining the open QoS reservation.

21. The method of claim 20, further comprising:
adding, independent of the attribute, the open QoS reservations to a reservation list; and
initiating, in response to determining the connection closing is due to a hard hand-off, a hand-off timing having an expiration,
wherein basing the maintaining, at least in part, on the result of the monitoring includes:
adding the open QoS reservation tied to the state of the connection to a hand-off reservation list, and
in response to the expiration occurring prior to the monitoring result indicating establishment of the connection between the wireless communication device and the second access network, removing all open QoS reservations on the hand-off reservation list from the hand-off reservation list and from the reservation list.

22. The method of claim 20, wherein an application has a data flow having a QoS reservation indicated by its attribute as tied to the state of the connection and a data flow having a QoS reservation indicated by its attribute as not tied to the state of the connection, the method further comprising,
upon the maintaining the open QoS reservations based, at least in part, on the result of the monitoring removing the QoS reservation indicated by its attribute as tied to the state of the connection, maintaining the application with the data flow having the QoS reservation indicated by its attribute as not tied to the state of the connection.

23. A wireless communication device comprising a processor configured to execute:
a communication application that participates in a minimum quality of service (QoS) communication session over a data-based communication network;
a connection module that receives a connection close message in response to a closed connection between the wireless communication device and a first access network during the minimum QoS communication session, and determines whether the closed connection is due to a hard handoff of the wireless communication device between the first access network and a second access network; and
a QoS engine that, based at least in part on the connection module determining that the closed connection is due to a hard handoff, maintains the minimum QoS communication session during the hard handoff.

24. The wireless communication device of claim 23, wherein the connection module determines that the closed connection is due to a hard handoff when the connection close message is bundled with a traffic channel assignment (TCA) message received from the second access network.

25. The wireless communication device of claim 23, wherein the communication application drops the minimum QoS communication session when the connection module determines that the closed connection is not due to a hard handoff.

26. The wireless communication device of claim 25,
wherein the QoS engine closes an open QoS reservation associated with a data flow included in the minimum QoS communication session when the connection module determines that the closed connection is not due to a hard handoff, and notifies the communication application that QoS for the minimum QoS communication session is suspended; and
wherein the communication application drops the minimum QoS communication session in response to the notification from the QoS engine.

27. The wireless communication device of claim 23,
wherein the QoS engine maintains the minimum QoS communication session when the hard handoff between the first access network and the second access network is successful; and
wherein the communication application drops the minimum QoS communication session when the hard handoff between the first access network and the second access network fails.

28. The wireless communication device of claim 23, wherein the QoS engine includes a QoS reservation controller that maintains open QoS reservations associated with data flows included in the minimum QoS communication session during the hard handoff in order to maintain the minimum QoS communication session.

29. The wireless communication device of claim 23, wherein the QoS engine includes a QoS reservation controller that:
- starts a handoff connection timer upon determining that the closed connection is due to the hard handoff;
- maintains an open QoS reservation within a reservation list associated with data flows included in the minimum QoS communication session; and
- adds the open QoS reservation to a handoff reservation list maintained by the QoS engine while the handoff connection timer is running.

30. The wireless communication device of claim 29, wherein the QoS reservation controller:
- retrieves from the reservation list the QoS reservation associated with one of the data flows included in the minimum QoS communication session;
- determines whether the QoS of the QoS reservation is tied to the connection state;
- determines whether the QoS reservation is open; and
- upon determining that the QoS reservation is open, maintains the open QoS reservation within the reservation list during the hard handoff when the QoS of the QoS reservation is determined as tied to the connection state.

31. The wireless communication device of claim 30, wherein the QoS reservation controller adds the open QoS reservation to the handoff reservation list when the QoS of the QoS reservation is determined as tied to the connection state.

32. The wireless communication device of claim 31, wherein data flows included in the minimum QoS communication session have a Radio Link Protocol (RLP) attribute called ReservationKKldle set to a zero value for a data flow that includes signaling traffic and set to a nonzero value for a data flow that includes media traffic, and wherein determining whether the data flow has a QoS tied to the connection state is based on the ReservationKKldle attribute.

33. The wireless communication device of claim 29, wherein the QoS reservation controller:
- stops the handoff connection timer when a connection is established between the wireless communication device and the second access network; and
- removes the open QoS reservations from the handoff reservation list.

34. The wireless communication device of claim 29, wherein the QoS reservation controller closes the open QoS reservations within the reservation list when the handoff connection timer expires before a connection is established between the wireless communication device and the second access network, removes the open QoS reservations from the handoff reservation list, and notifies the communication application that QoS for the minimum QoS communication session is suspended; and
wherein the communication application drops the minimum QoS communication session in response to the notification from the QoS engine.

35. The wireless communication device of claim 23, wherein the minimum QoS communication session comprises a voice over Internet Protocol (VoIP) call.

36. The wireless communication device of claim 23, wherein the data-based communication network comprises an Evolution-Data Optimized (EVDO) communication network utilizing one of an EVDO Revision 0 standard or an EVDO Revision A standard, and wherein the wireless communication device comprises an access terminal in the EVDO communication network and the first and second access networks comprise EVDO access networks.

37. The wireless communication device of claim 23, wherein the wireless communication device comprises one of an Evolution-Data Optimized (EVDO) phone, an Internet Protocol (IP) phone, a soft phone, a laptop with a wireless connection and a soft phone, or a personal digital assistant (PDA) with a wireless connection and a soft phone.

38. The wireless communication device of claim 23, wherein the processor comprises:
- a first processor configured to execute the communication application; and
- a second processor configured to execute the connection module and the QoS engine.

39. The wireless communication device of claim 23, wherein the QoS engine monitors an establishment of a connection between the wireless communication device and the second access network, and wherein the QoS engine maintains the open QoS reservation based, at least in part, on a result of the monitoring.

40. The wireless communication device of claim 39, wherein the QoS engine includes in maintaining the open QoS reservation initiating a hand-off time counting having an expiration and, in response to the expiration occurring prior to the monitoring indicating the establishment of the connection, removing the open QoS reservation.

41. The wireless communication device of claim 23, wherein the QoS engine monitors an establishment of a connection between the wireless communication device and the second access network,
- wherein the QoS engine determines from an attribute of the open QoS reservation whether a state of the QoS is tied to a state of the connection between the wireless communication device and the first access network, and
- wherein if the attribute indicates the open QoS reservation is tied to the state of the connection, the QoS engine maintains the open QoS reservation based, at least in part, on a result of the monitoring, and else maintains the open QoS reservation.

42. The wireless communication device of claim 41, wherein the QoS engine initiates, in response to determining the connection closing is due to a hard hand-off, a hand-off timing having an expiration, and
- wherein the QoS engine includes, in the maintaining based at least in part on the result of the monitoring, removing the open QoS reservation in response to the expiration occurring prior to the monitoring indicating the establishment of the connection.

43. The wireless communication device of claim 23, wherein the session is associated with an application having a plurality of data flows, each data flow having an open QoS reservation, the open QoS reservation having an attribute indicating whether a state of the QoS is tied to a state of the connection between the wireless communication device and the first access network,
- wherein the QoS engine monitors an establishment of a connection between the wireless communication device and the second access network,
- and wherein the QoS engine includes in the maintaining the open QoS reservations detecting the attribute and, if the attribute indicates the open QoS reservation is tied to the state of the connection, basing the maintaining, at least in part, on a result of the monitoring, else maintaining the open QoS reservation.

44. The wireless communication device of claim 43,
- wherein the QoS engine adds, independent of the attribute, the open QoS reservations to a reservation list; and
- the QoS engine initiates, in response to determining the connection closing is due to a hard hand-off, a hand-off timing having an expiration, wherein the QoS engine includes in basing the maintaining, at least in part, on the result of the monitoring:
  adding the open QoS reservation tied to the state of the connection to a hand-off reservation list, and
  in response to the expiration occurring prior to the monitoring result indicating establishment of the connection between the wireless communication device and the second access network, removing all open QoS reservations on the hand-off reservation list from the hand-off reservation list and from the reservation list.

45. The wireless communication device of claim 44, wherein an application has a data flow having a QoS reservation indicated by its attribute as tied to the state of the connection and a data flow having a QoS reservation indicated by its attribute as not tied to the state of the connection, wherein
  the QoS engine, upon removing, in maintaining the open QoS reservations based, at least in part, on the result of the monitoring, the QoS reservation indicated by its attribute as tied to the state of the connection, maintains the application with the data flow having the QoS reservation indicated by its attribute as not tied to the state of the connection.

46. A computer program product comprising a non-transitory computer-readable medium comprising:
  instructions for causing a computer to receive a connection close message in response to a closed connection between a wireless communication device and a first access network during a minimum Quality of Service (QoS) communication session over a data-based communication network;
  instructions for causing the computer to determine whether the closed connection is due to a hard handoff of the wireless communication device between the first access network and a second access network; and
  instructions for causing the computer to, based at least in part on determining that the closed connection is due to a hard handoff, maintain the minimum QoS communication session during the hard handoff.

47. The computer program product of claim 46, wherein the instructions cause the computer to determine that the closed connection is due to a hard handoff when the connection close message is bundled with a traffic channel assignment (TCA) message received from the second access network.

48. The computer program product of claim 46, wherein the non-transitory computer-readable medium further comprises instructions that cause the computer to drop the minimum QoS communication session upon determining that the closed connection is not due to a hard handoff.

49. The computer program product of claim 48, wherein the instructions cause the computer to:
  close an open QoS reservation associated with a data flow included in the minimum QoS communication session;
  notify a communication application within the wireless communication device that QoS for the minimum QoS communication session is suspended; and
  drop the minimum QoS communication session in response to the notification.

50. The computer program product of claim 46, wherein the non-transitory computer-readable medium further comprises:
  instructions that cause the computer to maintain the minimum QoS communication session when the hard handoff between the first access network and the second access network is successful; and
  instructions that cause the computer to drop the minimum QoS communication session when the hard handoff between the first access network and the second access network fails.

51. The computer program product of claim 46, wherein the instructions cause the computer to maintain open QoS reservations associated with data flows included in the minimum QoS communication session during the hard handoff in order to maintain the minimum QoS communication session.

52. The computer program product of claim 46, wherein the instructions cause the computer to:
  start a handoff connection timer upon determining that the closed connection is due to the hard handoff;
  maintain an open QoS reservation within a reservation list associated with data flows included in the minimum QoS communication session; and
  add the open QoS reservation to a handoff reservation list while the handoff connection timer is running.

53. The computer program product of claim 52, wherein the instructions cause the computer to:
  retrieve from the reservation list a QoS reservation associated with one of said data flows included in the minimum QoS communication session;
  determine whether the QoS reservation is open;
  determine whether the QoS of the QoS reservation is tied to the connection state; and
  upon determining that the QoS reservation is open, maintain the open QoS reservation within the reservation list during the hard handoff when the QoS of the QoS reservation is determined as tied to the connection state.

54. The computer program product of claim 53, wherein the non-transitory computer-readable medium further comprises instructions that cause the computer to add the open QoS reservation to the handoff reservation list when the QoS of the QoS reservation is determined as tied to the connection state.

55. The computer program product of claim 54, wherein data flows included in the minimum QoS communication session have a Radio Link Protocol (RLP) attribute called ReservationKKldle set to a zero value for a data flow that includes signaling traffic and set to a nonzero value for a data flow that includes media traffic, and wherein the instructions cause the computer to determine whether the QoS tied to the connection state based on the ReservationKKldle attribute.

56. The computer program product of claim 52, wherein the non-transitory computer-readable medium further comprises:
  instructions that cause the computer to stop the handoff connection timer once a connection is established between the wireless communication device and the second access network; and
  instructions that cause the computer to remove the open QoS reservation from the handoff reservation list.

57. The computer program product of claim 52, wherein the non-transitory computer-readable medium further comprises:
  instructions that cause the computer to close the open QoS reservation within the reservation list when the handoff connection timer expires before a connection is established between the wireless communication device and the second access network;
  instructions that cause the computer to remove the open QoS reservation from the handoff reservation list;
  instructions that cause the computer to notify a communication application within the wireless communication device that QoS for the minimum QoS communication session is suspended; and instructions that cause the computer to drop the minimum QoS communication session.

58. The computer program product of claim 46, wherein the minimum QoS communication session comprises a voice over Internet Protocol (VoIP) call.

59. The computer program product of claim 46, wherein the data-based communication network comprises an Evolution-Data Optimized (EVDO) communication network utilizing one of an EVDO Revision 0 standard or an EVDO Revision A standard, and wherein the wireless communication device comprises an access terminal in the EVDO communication network and the first and second access networks comprise EVDO access networks.

60. The computer program product of claim 46, wherein the wireless communication device comprises one of an Evolution-Data Optimized (EVDO) phone, an Internet Protocol (IP) phone, a soft phone, a laptop with a wireless connection and a soft phone, or a personal digital assistant (PDA) with a wireless connection and a soft phone.

61. The computer program product of claim 46, wherein the non-transitory computer-readable medium further comprises instructions to monitor an establishment of a connection between the wireless communication device and the second access network, and wherein the instructions to maintain the open QoS reservation include instruction to maintain the open QoS reservation based, at least in part, on a result of the monitoring.

62. A wireless communication device comprising:
means for participating in a minimum quality of service (QoS) communication session over a data-based-communication network;
means for receiving a connection close message in response to a closed connection between the wireless communication device and a first access network during the minimum QoS communication session;
means for determining whether the closed connection is due to a hard handoff of the wireless communication device between the first access network and a second access network; and
means for, based at least in part on a determining result of the means for determining indicating that the closed connection is due to a hard handoff, maintaining the minimum QoS communication session during the hard handoff.

63. The wireless communication device of claim 62, wherein the means for determining determines that the closed connection is due to a hard handoff when the connection close message is bundled with a traffic channel assignment (TCA) message received from the second access network.

64. The wireless communication device of claim 62, wherein the means for participating in drops the minimum QoS communication session when the means for determining determines that the closed connection is not due to a hard handoff.

65. The wireless communication device of claim 64,
wherein the means for maintaining closes open QoS reservation associated with data flow included in the minimum QoS communication session when the means for determining determines that the closed connection is not due to a hard handoff, and notifies the means for participating in that QoS for the minimum QoS communication session is suspended; and
wherein the means for participating in drops the minimum QoS communication session in response to the notification from the QoS engine.

66. The wireless communication device of claim 62,
wherein the means for maintaining maintains the minimum QoS communication session when the hard handoff between the first access network and the second access network is successful; and
wherein the means for participating in drops the minimum QoS communication session when the hard handoff between the first access network and the second access network fails.

67. The wireless communication device of claim 62, wherein the means for maintaining maintains open QoS reservations associated with data flows included in the minimum QoS communication session during the hard handoff in order to maintain the minimum QoS communication session.

68. The wireless communication device of claim 62, wherein the means for maintaining:
starts a handoff connection timer upon determining that the closed connection is due to the hard handoff;
maintains an open QoS reservation within a reservation list associated with data flows included in the minimum QoS communication session; and
adds the open QoS reservations to a handoff reservation list while the handoff connection timer is running.

69. The wireless communication device of claim 68, wherein the means for maintaining:
retrieves from the reservation list a QoS reservation associated with one of said data flows included in the minimum QoS communication session;
determines whether the QoS reservation is open;
determine whether the QoS of the QoS reservation is tied to the connection state;
upon determining that the QoS reservation is open, maintains the open QoS reservation within the reservation list during the hard handoff when the QoS of the QoS reservation is determined as tied to the connection state.

70. The wireless communication device of claim 69, wherein the means for maintaining adds the open QoS reservation to the handoff reservation list when the QoS of the QoS reservation is determined as tied to the connection state.

71. The wireless communication device of claim 69, wherein data flows included in the minimum QoS communication session have a Radio Link Protocol (RLP) attribute called ReservationKKldle set to a zero value for a data flow that includes signaling traffic and set to a nonzero value for a data flow that includes media traffic, and wherein determining whether the QoS is tied to the connection state is based on the ReservationKKldle attribute.

72. The wireless communication device of claim 68, wherein the means for maintaining:
stops the handoff connection timer when a connection is established between the wireless communication device and the second access network; and
removes the open QoS reservation from the handoff reservation list.

73. The wireless communication device of claim 68,
wherein the means for maintaining closes the open QoS reservation within the reservation list when the handoff connection timer expires before a connection is established between the wireless communication device and the second access network, removes the open QoS reservation from the handoff reservation list, and notifies the means for participating in that QoS for the minimum QoS communication session is suspended; and
wherein the means for participating in drops the minimum QoS communication session in response to the notification from the QoS engine.

74. The wireless communication device of claim 62, wherein the minimum QoS communication session comprises a voice over Internet Protocol (VoIP) call.

75. The wireless communication device of claim 62, wherein the communication network comprises an Evolution-Data Optimized (EVDO) communication network utilizing one of an EVDO Revision 0 standard or an EVDO Revision A standard, and wherein the wireless communication device comprises an access terminal in the EVDO communication network and the first and second access networks comprise EVDO access networks.

76. The wireless communication device of claim 62, wherein the wireless communication device comprises one of an Evolution-Data Optimized (EVDO) phone, an Internet Protocol (IP) phone, a soft phone, a laptop with a wireless connection and a soft phone, or a personal digital assistant (PDA) with a wireless connection and a soft phone.

77. The wireless communication device of claim 62 comprising means for monitoring an establishment of a connection between the wireless communication device and the second access network, and wherein the means for maintaining the minimum QoS communication session and the open QoS reservation during the hard handoff performs the maintaining based, at least in part, on a result of the monitoring.

* * * * *